(12) United States Patent
Boron et al.

(10) Patent No.: US 11,968,435 B2
(45) Date of Patent: Apr. 23, 2024

(54) CAMERA ASSEMBLY FOR A VEHICLE AND METHOD OF MANUFACTURING THE SAME

(71) Applicant: Aptiv Technologies AG, Schaffhausen (CH)

(72) Inventors: Artur Boron, Dublin (IE); Grzegorz Szostek, Dublin (IE); Sebastian Melfried, Dublin (IE)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 17/455,254

(22) Filed: Nov. 17, 2021

(65) Prior Publication Data

US 2022/0191363 A1 Jun. 16, 2022

(30) Foreign Application Priority Data

Dec. 11, 2020 (EP) .................................. 20213579

(51) Int. Cl.
| *H04N 23/55* | (2023.01) |
| *B60R 11/04* | (2006.01) |
| *G02B 7/02* | (2021.01) |
| *G02B 13/14* | (2006.01) |
| *H04N 23/51* | (2023.01) |
| *H04N 23/54* | (2023.01) |
| *H04N 23/56* | (2023.01) |

(52) U.S. Cl.
CPC ............. *H04N 23/55* (2023.01); *B60R 11/04* (2013.01); *G02B 7/02* (2013.01); *G02B 13/14* (2013.01); *H04N 23/51* (2023.01); *H04N 23/54* (2023.01); *H04N 23/56* (2023.01)

(58) Field of Classification Search
CPC ........ H04N 23/55; H04N 23/51; H04N 23/54; H04N 23/56; H04N 23/57; H04N 23/50; B60R 11/04; G02B 7/02; G02B 13/14
See application file for complete search history.

(56) References Cited

U.S. PATENT DOCUMENTS

| 9,487,159 B2 | 11/2016 | Achenbach |
| 9,703,176 B2 | 7/2017 | Park et al. |
| 10,142,532 B2 | 11/2018 | Mleczko |
| 10,230,875 B2 | 3/2019 | Mleczko et al. |
| 10,272,857 B2 | 4/2019 | Conger et al. |

(Continued)

FOREIGN PATENT DOCUMENTS

WO 2013063014 5/2013

OTHER PUBLICATIONS

"Extended European Search Report", EP Application No. 20213579. 4, dated May 21, 2021, 8 pages.

*Primary Examiner* — Nasim N Nirjhar

(74) *Attorney, Agent, or Firm* — Harness, Dickey & Pierce, P.L.C.

(57) ABSTRACT

Camera assembly for a vehicle. A sensor subassembly includes a rear housing and a circuit board fixed to the rear housing. The circuit board includes an imager. An optical subassembly includes a lens and a lens holder for holding the lens. The lens holder forms a front housing mated to the rear housing. The optical subassembly is fixed to the sensor subassembly by a cured adhesive applied at a mating interface between the lens holder and the rear housing to align the optical subassembly to the sensor subassembly for focusing the lens on the imager.

20 Claims, 2 Drawing Sheets

(56) References Cited

U.S. PATENT DOCUMENTS

| | | |
|---|---|---|
| 10,367,984 B2 | 7/2019 | Mleczko |
| 10,477,083 B2 | 11/2019 | Mleczko et al. |
| 10,518,724 B2 | 12/2019 | Conger et al. |
| 10,694,090 B2 | 6/2020 | Mleczko |
| 10,930,126 B1* | 2/2021 | Jeong .................. H04N 23/611 |
| 2009/0201414 A1* | 8/2009 | Kinoshita ......... H01L 31/02325 |
| | | 348/E5.022 |
| 2010/0321497 A1 | 12/2010 | Onishi et al. |
| 2011/0034786 A1 | 2/2011 | Cadio et al. |
| 2014/0333828 A1* | 11/2014 | Han ....................... H04N 23/50 |
| | | 348/373 |
| 2016/0182787 A1* | 6/2016 | Sesti ................... G02B 13/001 |
| | | 156/64 |
| 2017/0372114 A1* | 12/2017 | Cho .................... G06V 40/1318 |
| 2018/0259832 A1* | 9/2018 | Chen ...................... G03B 17/55 |
| 2019/0373142 A1 | 12/2019 | Fujiwara et al. |
| 2020/0084346 A1 | 3/2020 | Mleczko et al. |
| 2022/0099909 A1* | 3/2022 | Li .......................... G03B 17/14 |

\* cited by examiner

CAMERA ASSEMBLY FOR A VEHICLE AND METHOD OF MANUFACTURING THE SAME

CROSS-REFERENCE TO RELATED APPLICATION

This application claims priority to European Patent Application Number 20213579.4, filed Dec. 11, 2020, the disclosure of which is hereby incorporated by reference in its entirety herein.

BACKGROUND

In modern vehicles, it is common to include one or more cameras for monitoring the vehicle's exterior and/or interior environment. Cameras may, for instance, form a sensor input for safety or autonomous driving functions.

FIG. 1 shows a conventional vehicle camera assembly 1 which may, for instance, be fitted to the interior of the vehicle for monitoring of the cabin. The camera assembly 1 has a transparent cover lens 4, beneath which sits two infrared (IR) emitter windows 3 either side of a lens 2. FIG. 2 shows an exploded view of the camera assembly 1 in which the cover lens 4 is fixed to a front housing 5, that also supports the IR emitter windows 3 which emit IR light and act as filter for preventing incoming visible light from entering the housing. Behind this sits an IR LED board 6 which includes IR LEDs for emitting the IR light. At the same time, the lens 2 is seated within a lens holder 7, which is aligned and focused onto the imager sensor board 10 and is fixed in place by an adhesive 8. A shielding case 11 is fitted to the back of the image sensor board 10 and the assembly is received within the rear housing 12. Thermal pads 9 are sandwiched between the shielding case 11 and the rear housing 12, and between the IR LED board 6 and the rear housing 12.

A problem with the above conventional arrangement is the large number of parts, which makes the assembly process complicated and thereby increases cost. For example, because of manufacturing tolerances, the alignment between the lens 2 and imager sensor board 10 has to be precisely adjusted for each independent unit in order to ensure proper focusing onto the imager. As such, during assembly, the lens 2, the lens holder 7 and the imager sensor board 10 need to be first aligned and focused in a separate alignment process. Once correctly positioned, the adhesive 8 is then cured. The resulting subassembly of the lens 2, the lens holder 7 and the imager sensor board 10 may then be fitted into shielding case 11, which is in turn secured to the rear housing 12. The other parts may be then secured to either the front or rear housing, after which the housing parts 5,12 are secured together. Accordingly, a large number of parts must each be fixed in place independently. Furthermore, as different models of cameras have different shaped parts, it is common for many of these assembly operations to involve manual steps because the design variances between models makes automation difficult and would require different tooling for each type of camera.

There therefore remains a need for an improved vehicle camera assembly and method of manufacturing the same.

SUMMARY

The present disclosure relates to a camera assembly for a vehicle and a method of manufacturing the same. The present disclosure is particularly relevant to a vehicle camera module and a method of assembling such a vehicle camera module.

The present disclosure concerns a vehicle camera assembly and method of assembling a vehicle camera assembly.

According to a first aspect, there is provided a camera assembly for a vehicle, including: a sensor subassembly including a rear housing and a circuit board fixed to the rear housing, the circuit board including an imager; an optical subassembly including a lens and a lens holder for holding the lens, wherein the lens holder forms a front housing mated to the rear housing; wherein the optical subassembly is fixed to the sensor subassembly by a cured adhesive applied at a mating interface between the lens holder and the rear housing to align the optical subassembly to the sensor subassembly for focusing the lens on the imager.

In this way, a camera may be provided which has a significantly smaller number of parts, with the lens holder functioning to both support the lens and form the front part of the housing. In addition, focusing alignment between the lens and the imager may be achieved at the same time as the preassembled optical subassembly is fixed to the preassembled sensor assembly. This thereby reduces the number of manufacturing steps and hence speeds up the assembly process, whilst ensuring accurate focusing of the assembly as a whole.

In embodiments, the lens holder includes an infrared, IR, transmitting material. In this way, the lens holder may also perform the function of the IR emitter windows. In embodiments, the lens holder may be formed from two-component parts. In embodiments, one of the two-component parts is formed from an IR transmitting material.

In embodiments, the sensor subassembly further includes one or more IR emitters fixed to the rear housing and aligned for emitting IR light through the lens holder. In this way, the camera assembly may provide an IR light source for the camera. In embodiments, the IR emitters may be IR LEDs.

In embodiments, the IR emitters are provided on the circuit board. In this way, the circuit board may provide both the imager circuitry and the IR emitting circuit on a single board, thereby further reducing the number of parts and simplifying assembly. In other embodiments, the IR emitters may be provided on pedestals such that they project further forward into the lens holder. In other embodiments, one or more separate IR circuit boards may be provided for supporting the one or more emitters.

In embodiments, the lens holder includes one or more IR window formations aligned with the one or more IR emitters for transmitting emitted IR light therethrough. In this way, the lens holder may have IR window formations formed integrally therein.

In embodiments, the one or more IR window formations are profiled for directing the IR light transmitted therethrough. In this way, the IR window formations may be shaped for directing IR light to the field of view areas of the camera. In embodiments, the rear surfaces of the one or more IR window formations are profiled for directing the IR light.

In some embodiments, the lens holder may further include one or more baffles for preventing light cross talk into the lens and/or imager. The baffles may further include a textured surface for reducing the transmission of visible and/or IR light. In other embodiments, the baffles may include an opaque material for reducing the transmission of visible and/or IR light. The one or more baffles may thereby prevent visible light entering through the lens holder, or IR light emitted by the one or more IR emitters, from being directly transmitted into the lens or onto the imager.

In embodiments, the sensor subassembly further includes a thermal pad located between the rear housing and the circuit board. In this way, the thermal pad may thereby act as heat sink to the rear housing, without requiring additional heatsink components to be provided.

In embodiments, the rear housing may include a snap-fit mounting formation for fixing the circuit board to the rear housing. In this way, the circuit board may be easily secured into the rear housing. In other embodiments other fixings may be used.

In embodiments, the rear housing includes a connector receptacle for receiving a connector, wherein the connector receptacle is aligned with a circuit board interface for connecting the connector to the circuit board interface when it is received within the connector receptacle. In this way, a camera connector, such as a FAKRA connector may be easily attached to the camera assembly for forming an operable connection with the internal components.

In embodiments, the connector receptacle is shaped for mating with the connector. In this way, the rear housing may form a tight fit connection around the camera connector for improving the sealing of the camera module. In embodiments, the connector can be shaped to match the rear housing.

In embodiments, the cured adhesive forms a seal around the mating interface between the lens holder and the rear housing. In this way, the gluing process may function to seal the assembly's interior, thereby removing the need for gaskets to be provided to protect the internal components.

In embodiments, the lens holder further includes a lens receptacle into which the lens is received for holding the lens. In this way, the lens may be seated within a formation of the lens holder for aligning the lens within the front housing.

In embodiments, the lens holder is formed of an optically transparent material. In this way, the lens may be covered and protected by the lens holder.

In embodiments, the lens holder further includes a cover lens formation formed therein for covering a front of the lens. In this way, the lens may be seated, for example, within a lens receptacle behind a portion of the lens holder such that the lens holder forms a protective cover for protecting the optical components of the camera.

According to a second aspect, there is provided a method of manufacturing a camera assembly for a vehicle, including the steps of: assembling a sensor subassembly including a rear housing and a circuit board fixed to the rear housing, the circuit board including an imager; assembling an optical subassembly including a lens and a lens holder for holding the lens, wherein the lens holder forms a front housing for mating to the rear housing; applying an adhesive to a mating interface between the lens holder and the rear housing; aligning the optical subassembly to the sensor subassembly for focusing the lens on the imager; and curing the adhesive for fixing the aligned optical subassembly to the sensor subassembly at the mating interface.

In this way, an improved method of manufacturing a camera assembly may be provided, which involves a smaller number of assembly steps utilizing a smaller number of parts. As such, a faster and more accurate assembly process may be achieved.

BRIEF DESCRIPTION OF THE DRAWINGS

Illustrative embodiments are described with reference to the accompanying drawings in which.

DETAILED DESCRIPTION

Figure 1:
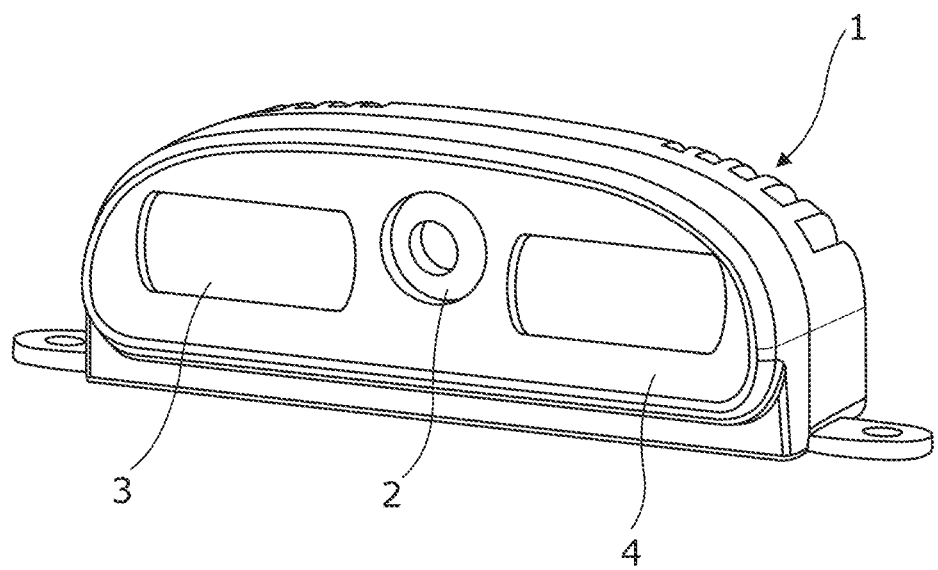
FIG. 1 shows a conventional vehicle camera assembly.
Figure 2:
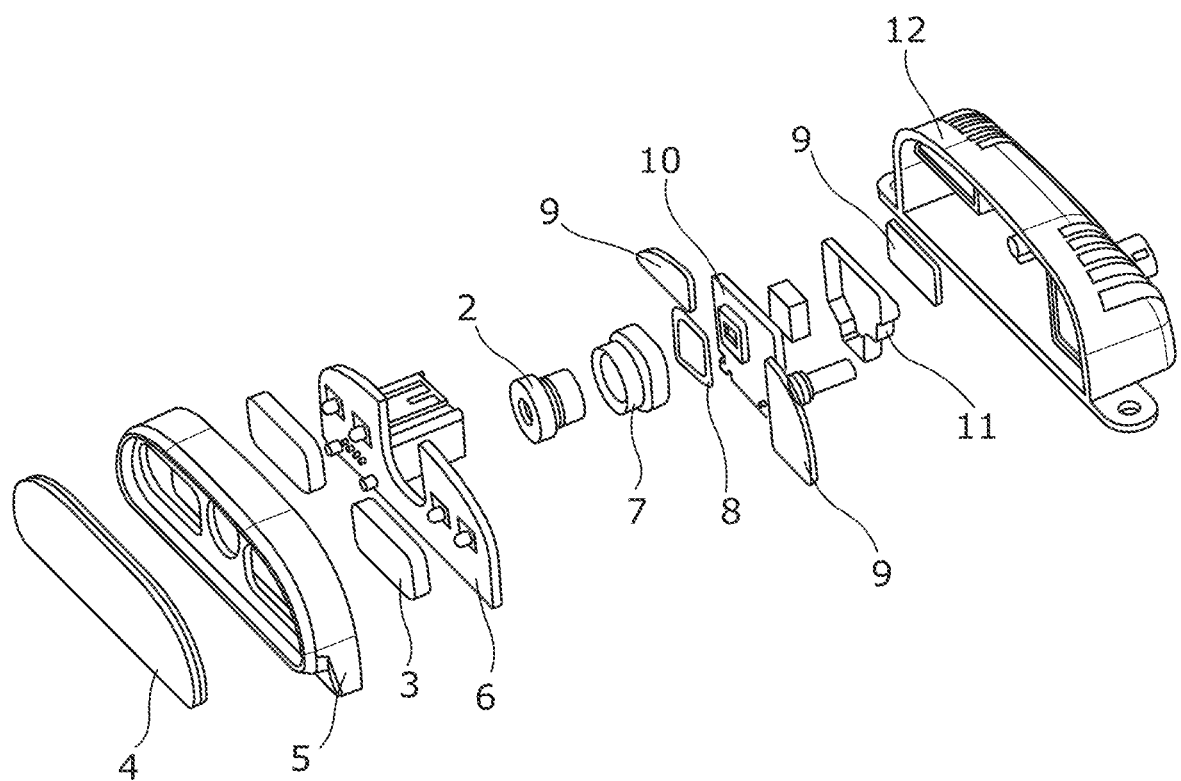
FIG. 2 shows an exploded view of the vehicle camera assembly shown in FIG. 1.
Figure 3:
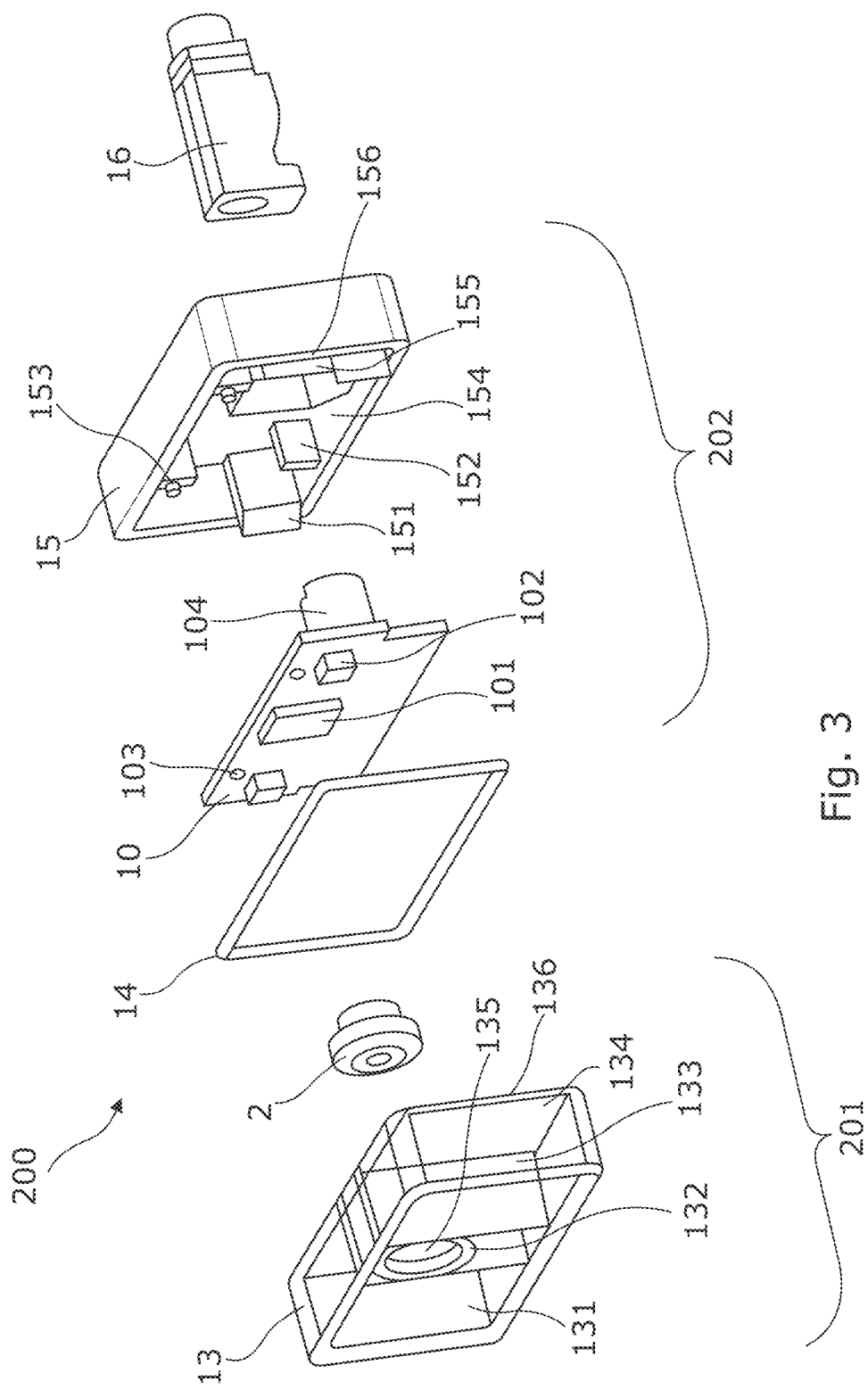
FIG. 3 shows an exploded view of a vehicle camera assembly according to an illustrative embodiment.

A first illustrative embodiment is described with reference to FIG. 3, which shows an exploded view of a vehicle camera assembly 200.

The camera assembly 200 is assembled from an optical subassembly 201 and a sensor subassembly 202, with the two subassemblies being joined by an adhesive joint 14.

The optical subassembly 201 houses the lens 2 which is secured within a lens receptacle 132 formed within the lens holder 13. The lens 2 includes a plurality of optical elements for focusing light entering the camera. The lens holder 13 is formed as a two-component part including a transparent material transparent to infrared (IR), and an opaque material for preventing the transmission of IR. The lens holder 13 may be opaque to visible light to hide internal parts of the assembly in use. Baffle formations 133 are provided either side of the lens receptacle 132 and define two cavities 134 either side of lens 2. The baffle formations 133 are formed of the opaque material. The front panel of the lens housing 13 is formed of the transparent material and its rear face is profiled in the regions in front of the cavities 134. These regions thereby form IR windows 131 for directing IR light emitted into the cavities 134 out of the front of the camera assembly 200. The front panel of the lens housing 13 also provides an optically transparent cover 135 for protecting the lens 2.

During assembly, the lens 2 is fixed into lens receptacle 132 within the lens holder 13 to form the optical subassembly 201. The rear facing peripheral boundary of the lens holder 13 defines a first interface surface 136 for fixing to the sensor subassembly 202, as is described in further detail below.

The sensor subassembly 202 includes a printed circuit board 10, which is received within a rear housing 15. The circuit board 10 includes an imager 101 for generating digital image data based on input light, as well as two IR LEDs 102 for emitting IR light. The circuit board 10 is further provided with keying formations 103 which key into corresponding formations 153 provided on the rear housing 15. An interface 104 projects from the rear face of the circuit board 10 for providing power to the IR LEDs 102 and for outputting image data from the imager 101.

The rear housing 15 includes an internal cavity 154 within which is provided a plurality of mounting formations 152 onto which the circuit board 10 is mounted. The mounting formations 152 include the keying formations 153 for aligning the circuit board 10 relative to the rear housing 15. Snap fit fixings 151 are provided for locking the circuit board 10 to the rear housing 15 once the circuit board 10 has been pressed onto the mounting formations 152. The rear housing further includes a connector receptacle 155 which is shaped to mate with FAKRA connector 16. At the same time, once the circuit board 10 is mounted within the rear housing 15, the PCB interface 104 is located within the connector receptacle 155 such that, when the connector 16 is inserted into the back face of the rear housing 15, it connects to the PCB interface 104 for establishing a connection with the imager 101 and the IR LEDs 102. The connector receptacle 155 therefore acts to align the connector 16 with the PCB interface 104, as well as form a tight abutment around the exterior face of the connector 16 for improving the sealing of the rear housing's interior.

The front facing peripheral boundary of the rear housing 15 defines a second interface surface 156 for fixing to the first interface surface 136 of the optical subassembly 201. In this respect, the first and second interface surfaces 136,156 are profiled to mate with one another such that the surfaces oppose each other when the optical subassembly 201 and the sensor subassembly 202 are brought together. This thereby allows the adhesive which subsequently forms the adhesive joint 14 to be sandwiched therebetween. In embodiments, the first and/or second interface surfaces 136,156 may include a glue channel for receiving an adhesive layer for forming the adhesive joint 14 when cured.

During assembly, the circuit board 10 is fixed into rear housing 15 to form the sensor sub assembly 202.

Once the optical subassembly 201 and the sensor subassembly 202 have been assembled independently, the subassemblies are then fitted to an alignment and focusing jig. A UV curable adhesive is applied to one or both of the first and second interface surfaces 136,156, and the surfaces are brought together to align the lens holder 13 with the rear housing 15. Within the alignment and focusing jig, minute adjustments are made to the relative positions between optical subassembly 201 and the sensor subassembly 202 so that the light from the lens 2 accurately focusses onto the imager 101. Once an optimized focusing position has been achieved, a UV lamp is used to cure the adhesive to form the adhesive joint 14. This thereby acts to fix the lens 2 in a focused position relative to the imager 101, as well as sealing the interior formed between the lens holder 13 and the rear housing 15. As such, the lens holder 13 thereby functions as a front housing part in the assembly.

Once assembled, the IR LEDs 102 are positioned to emit IR light into the IR cavities 134 behind IR windows 131. As such, when the IR LEDs 102 are activated, IR light is emitted out through the IR windows 131 and is directed into the field of view of the lens 2. Reflected IR light is then received into the lens 2 and focused onto the imager 101.

Once the assembly is formed, the baffle formations 133 act to prevent both IR and visible light within the IR cavities 134 from leaking through to the lens 2 or the imager 101.

Accordingly, with the above described assembly and method, a camera module may be manufactured from as little as four parts. This thereby facilitates simplified manual or automated assembly, which in turn may allow cameras to be manufactured faster and at lower cost. At the same time, the interior formations within the lens holder 13 and the rear housing 15 may be standardized across different camera models, even if the exterior shapes of the housing parts are different. This may therefore mitigate the need for different tooling and jigs for different camera models, thereby further minimizing manufacturing costs.

It will be understood that the embodiments illustrated above shows an application only for the purposes of illustration. In practice, embodiments may be applied to many different configurations, the detailed embodiments being straightforward for those skilled in the art to implement.

In this connection, for example, it will be understood that thermal pads can be applied between rear housing and the circuit board, if necessary.

Furthermore, it will be understood that conventional fixing arrangements may be used to connect the lens to the lens holder and to connect the circuit board to the rear housing. For example, the lens may be secured to the lens holder by an adhesive. It will also be understood that screw fixings may, for instance, be provided instead of, or in addition to, the snap-fit connections used to secure the circuit board to the rear housing in the illustrative embodiment.

Finally, it will also be understood that a specialized UV lamp and alignment and focusing jig, may be used during manufacture. For example, in preferred embodiments, a UV lamp configured to simultaneously cure the adhesive joint 14 over the whole of the mating interface may be used. As such, the UV lamp would be considerably larger than conventional UV lamps used currently in lens/imager focusing operations.

What is claimed is:

1. A camera assembly comprising:
   a sensor subassembly that comprises a rear housing and a circuit board fixed to the rear housing, the circuit board comprising an imager and one or more infrared (IR) emitters, wherein the rear housing comprises:
      an internal cavity with mounting formations onto which the circuit board is disposed;
      at least one retention formation for fixing the circuit board to the rear housing;
      a connector receptacle for receiving a connector, the connector receptacle being aligned with a circuit board interface of the circuit board; and
      a second interface surface; and
   an optical subassembly that comprises a lens holder, a lens fixed to the lens holder, and an IR transmitting material, the lens holder functioning as a front housing that is mated to the rear housing via an ultraviolet (UV) cured adhesive applied between the second interface surface of the rear housing and a first interface surface of the lens holder that is profiled to oppose the second interface surface of the rear housing, the optical subassembly being aligned with the sensor subassembly, prior to curing the UV cured adhesive, via an alignment and focusing jig that adjusts a relative position between the optical subassembly and the sensor subassembly to focus light from the lens on the imager and to allow light from the IR emitters to transmit through the IR transmitting material and into an environment of the camera assembly.

2. The camera assembly of claim 1, wherein the sensor subassembly further comprises a thermal pad located between the rear housing and the circuit board.

3. The camera assembly of claim 1, wherein the connector receptacle is shaped to mate with the connector.

4. The camera assembly of claim 1, wherein the UV-cured adhesive forms a seal around the mating interface between the lens holder and the rear housing.

5. The camera assembly of claim 1, wherein the lens holder further comprises a lens receptacle configured to receive and hold the lens.

6. The camera assembly of claim 1, wherein the lens holder is formed of an optically-transparent material.

7. The camera assembly of claim 1, wherein the lens holder further comprises a cover lens formation formed in the lens holder and configured to cover a front of the lens.

8. The camera assembly of claim 1, wherein the camera assembly is configured to be integrated into a vehicle.

9. A method of manufacturing a camera assembly, the method comprising:
   assembling a sensor subassembly by fixing a circuit board to a rear housing, the circuit board comprising an imager and one or more infrared (IR) emitters, the assembling the sensor subassembly comprising:
      disposing the circuit board onto mounting formations of the rear housing;

engaging one or more retention formations of the rear housing; and causing an interface of the circuit board to be aligned with a connector receptacle of the rear housing;

assembling an optical subassembly that comprises a lens holder, a lens fixed to the lens holder, and an IR transmitting material, the lens holder functioning as a front housing configured to mate to the rear housing, the assembling the optical subassembly performed without aligning the lens to the lens holder;

applying an ultraviolet (UV) adhesive to a mating interface between the lens holder and the rear housing, the mating interface being between interface surfaces of the rear housing and the lens holder that oppose each other;

aligning, via an alignment and focusing jig that adjusts a relative position between the optical subassembly and the sensor subassembly, the optical subassembly to the sensor subassembly for focusing light from the lens on the imager and for allowing light from the IR emitters to transmit through the IR transmitting material and into an environment of the camera assembly; and curing the UV adhesive for fixing the optical subassembly to the sensor subassembly at the mating interface.

10. The camera assembly of claim 1, wherein the lens holder comprises the IR transmitting material.

11. The camera assembly of claim 10, wherein the IR transmitting material comprises one or more IR window formations.

12. The camera assembly of claim 11, wherein the IR window formations are profiled to direct the IR light transmitted therethrough.

13. The camera assembly of claim 10, wherein the lens holder is formed of the IR transmitting material.

14. The camera assembly of claim 1, wherein:
the circuit board is affixed to the rear housing without an adhesive; and
the lens is affixed to the lens holder without an adhesive.

15. The method of claim 9, wherein the lens holder comprises the IR transmitting material.

16. The method of claim 15, wherein the IR transmitting material comprises one or more IR window formations.

17. The method of claim 16, wherein the IR window formations are profiled to direct the IR light transmitted therethrough.

18. The method of claim 9, further comprising forming the lens holder of the IR transmitting material.

19. A method of assembling a camera, the method comprising:

obtaining a rear housing, the rear housing comprising:
an internal cavity;
a first interface surface surrounding the internal cavity;
one or more mounting formations;
one or more keying formations;
one or more retention formations; and
a connector receptacle;

obtaining a circuit board, the circuit board comprising:
an imager;
a printed circuit board (PCB) interface; and
one or more infrared (IR) emitters;

mounting the circuit board to the internal cavity to form a sensor subassembly, such that:
the mounting formations support the circuit board within the internal cavity;
the keying formations align the circuit board to the rear housing;
the retention formations fix the circuit board to the mounting formations; and
the PCB interface is aligned with the connector receptacle;

obtaining a lens holder that functions as a front housing, the lens holder comprising:
a second interface surface that is profiled to mate with the first interface surface;
a lens receptacle; and
an IR transmitting material;

obtaining a lens;

inserting the lens into the lens receptacle to form an optical subassembly;

disposing an ultraviolet (UV) curable adhesive to at least one of the first interface surface or the second interface surface;

combining the sensor subassembly with the optical subassembly such that the first interface surface is proximate the second interface surface;

aligning the lens to the imager via an alignment and focusing jig that creates relative movement between the optical subassembly and the sensor subassembly such that light from the lens is focused on the imager; and curing the UV curable adhesive via UV light to secure and seal the optical subassembly to the sensor subassembly.

20. The method of claim 19, wherein:
the circuit board is mounted to the internal cavity without an adhesive; and
the lens is fixed to the lens receptacle without an adhesive.

* * * * *